United States Patent
Shamil (12)

(10) Patent No.: US 6,265,012 B1
(45) Date of Patent: *Jul. 24, 2001

(54) REDUCTION OF LINGERING SWEET AFTERTASTE OF SUCRALOSE

(75) Inventor: Syed H. Shamil, White Plains, NY (US)

(73) Assignee: PepsiCo, Inc., Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/263,953

(22) Filed: Mar. 8, 1999

Related U.S. Application Data

(63) Continuation of application No. 08/748,975, filed on Nov. 14, 1996, now Pat. No. 5,902,628.

(51) Int. Cl.[7] .................................. A23L 2/38; A23L 2/60
(52) U.S. Cl. .......................... 426/590; 426/548; 426/598; 426/658
(58) Field of Search ..................................... 426/590, 594, 426/597, 598, 599, 592, 591, 593, 658, 548

(56) References Cited

U.S. PATENT DOCUMENTS

| 4,915,969 | * | 4/1990 | Beyts ..................................... 426/548 |
| 5,380,541 | * | 1/1995 | Beyts et al. .......................... 426/548 |

OTHER PUBLICATIONS

Database Abstract. AN 69 (06):H0603 FSTA for Brauwelt, vol. 109, No. 18, pp. 299–302, Author: Benk, 1969.*

Database Abstract AN 90(05):H0005 FSTA for Journal of Food Science. vol. 55, No. 1, pp. 244–246. Authors: Quinlan et al, 1990.*

* cited by examiner

*Primary Examiner*—Anthony J. Weier
(74) *Attorney, Agent, or Firm*—Fitzpatrick, Cella, Harper & Scinto

(57) ABSTRACT

The invention is directed to the use of one or more tannic acid compounds to reduce the lingering sweet aftertaste of artificially-sweetened beverages, in particular sucralose-sweetened cola beverages.

11 Claims, No Drawings

REDUCTION OF LINGERING SWEET AFTERTASTE OF SUCRALOSE

This is a continuation of application Ser. No. 08/748,975, filed Nov. 14, 1996, now U.S. Pat. No. 5,902,628, all of which are incorporated herein by reference.

BACKGROUND OF THE INVENTION

1. Field of the Invention

The present invention relates generally to beverage compositions having minimal lingering sweet aftertastes and to methods of making such beverage compositions. More particularly, the present invention relates to the use of tannic acid to reduce the lingering sweet aftertaste in beverage compositions that have been sweetened with sucralose.

2. Description of the Related Art

Artificial sweeteners are common ingredients in beverage compositions. Unfortunately, artificial sweeteners often negatively affect taste. Various approaches have been explored in the past to overcome such negative effects.

For example, U.S. Pat. No. 3,647,483 issued to Eisenstadt discloses that glucono delta lactone, sodium gluconate and cream of tartar powder may be used to eliminate the bitter aftertaste conventionally associated with the artificial sweetener saccharine. U.S. Pat. No. 4,219,579 issued to Pampiano, on the other hand, provides that an aqueous extract of Gentiana Lutea may be used to reduce or eliminate the bitter aftertaste of saccharine. U.S. Pat. No. 4,254,155 issued to Dwivedi teaches that the lingering bitter aftertaste associated with the use of the artificial sweetener neohesperidin dihydrochalcone may be overcome by adding a taste modifier such as glycine, maltol, ethyl maltol, monosodium glutamate, disodium 5'-inosinate, sodium acetate, calcium sulfate or calcium chloride. U.S. Pat. No. 3,510,310 issued to Breck woldt provides that one may eliminate the problems with the taste, mouthfeel and texture of beverage mixes pre-sweetened with the artificial sweetener N-cyclohexylsulfamic acid by adding adipic, citric, fumaric, malic, lactic, tartaric, or succinic acid, or mixtures thereof. Finally, U.S. Pat. No. 5,106,632 issued to Wong, which relates to sweetening compositions containing at least potassium chloride, one or more food grade additives, and the artificial sweetener acesulfame-K, discloses that fumaric, adipic, succinic, citric, butyric, capric, tartaric and malic acid, or mixtures thereof, may be added to the disclosed compositions to impart a taste or sensation of sourness.

In each of the patents mentioned above, the respective food-grade acids were used to overcome the negative effects on taste associated with the particular artificial sweetener employed. Food-grade acids also have been used, however, to affect properties of artificially-sweetened beverages other than those directly associated with taste. For example, U.S Pat. No. 4,292,336 issued to Latymer relates to a heat-stable sweetening composition containing a peptide sweetener such as thaumatin, and provides that the pH of such a composition can be adjusted by adding citric, malic, fumaric or mucie (galactaric) acids. Dwivedi, discussed above, teaches that certain acidulants may be added to compositions sweetened with the artificial sweetener neohesperidin dihydrochalcone to overcome discoloration problems associated with this particular sweetener.

SUMMARY OF THE INVENTION

The prior art has failed to address, however, the problem of reducing the lingering sweet aftertaste present in beverage compositions that have been artificially sweetened with sucralose. Because sucralose is a promising artificial sweetener for beverages such as colas, coffees, teas, dairy beverages, fruit juice drinks, and other flavored beverages such as orange and lemon-lime drinks, there is a need in the art for sucralose-sweetened compositions having reduced lingering sweet aftertastes and for methods for reducing the lingering sweet aftertaste typically associated with sucralose-sweetened beverage compositions.

The present invention meets this need in the art by providing sucralose-sweetened beverage compositions that have been modified through the addition of a relatively low amount of one or more tannic acid compounds so as to produce compositions possessing minimal or no lingering sweet aftertaste. The present invention further relates to methods for reducing the lingering sweet aftertaste of sucralose-sweetened beverage compositions by adding a stoichiometrically effective amount of one or more tannic acid compounds to such sucralose-sweetened beverage compositions. The present invention additionally provides methods of making beverage compositions having minimal or no lingering sweet aftertastes which involve blending sucralose with one or more tannic acid compounds.

Additional aspects and advantages of the present invention are set forth in part in, or will be apparent from, the detailed description of exemplary embodiments which follows, or may be learned through routine practice of the invention.

DETAILED DESCRIPTION OF THE INVENTION

Sucralose is an artificial sweetener often used in beverage compositions, either alone or in combination with other high-intensity artificial sweeteners such as acesulfame-K, cyclamate and alitame. In a water solution, sucralose in about 600 times sweeter than sugar and possesses a clean taste profile. Unfortunately, sucralose exhibits a prolonged lingering sweet aftertaste in certain beverage compositions, especially cola beverage compositions. Consumers consider this lingering sweet aftertaste to be undersirable.

In accordance with the present invention, it has been discovered that the use of a relatively low amount of one or more tannic acid compounds compared to the amount of sucralose present significantly reduces or eliminates the lingering sweet aftertaste associated with sucralose. Thus, the aftertaste of sucralose-sweetened beverage compositions (both carbonated and non-carbonated) can be brought closer to that of "regular" products, i.e. products sweetened with sucrose or high fructose corn syrup ("HFCS"), by the addition of one or more tannic acid compounds.

For purposes of the present invention, the terminology "tannic acid compound" refers to the group of natural, plant-derived phenolic compounds known as tannins as well as structural equivalents and derivatives thereof, including but not limited to both hydrolyzable tannins and condensed tannins. According to one embodiment of the present invention, the one or more tannic acid compounds used to reduce the lingering sweet aftertaste of sucralose are those having molecular weights of between from about 200 to about 1900, and more preferably between from about 400 to about 900. Gallotannins of the general formula $C_{19,n}H_{13,n}O_{12,n}$, known as polygalloylesters of glucose-guinic acid, are particularly useful for reducing or eliminating the lingering sweetness of sucralose-sweetened beverage compositions. Such tannic acid compounds are commercially available. For example, OmniChem Products supplies a variety of gallotannin compounds under the Tanal, Tanex, Floctan, Textan, Oenotan, Biograde and Brewtan designations.

In general, the one or more tannic acid compounds are added to the beverage composition according to the present invention in an amount effective to reduce or eliminate the lingering sweet aftertaste associated with the sucralose component of the composition. The amount required depends on the amount of sucralose present.

According to a preferred embodiment, the amount of the one or more tannic acid compounds effective to reduce or eliminate the lingering sweet aftertaste of sucralose is a stoichiometric amount of tannic acid relative to sucralose of approximately 10±1 ppm tannic acid to 220 ppm sucralose. In other words, a beverage composition containing 220 ppm sucralose preferably contains 10±1 ppm tannic acid, whereas a beverage composition containing only 100 ppm sucralose preferably contains only 5 ppm tannic acid.

Higher levels of tannic acid beyond the stoichiometric amount noted above typically will not provide any further beneficial effects with respect to aftertaste. However, an excess of tannic acid may be used in accordance with the present invention as long as there is no resulting adverse effect on taste or any other sensory property of the beverage composition. Thus, in accordance with one embodiment of the present invention, the tannic acid may be present in a stoichiometric amount of about 10–200 ppm tannic acid per 220 ppm sucralose.

In accordance with another preferred embodiments of the present invention, additional sweeteners, such as nutritive and non-nutritive (high-intensity, artificial) sweeteners, are present in the beverage composition. Exemplary nutritive sweeteners suitable for use in combination with sucralose include HFCS and sucrose. Exemplary high-intensity, artificial sweeteners suitable for use in combination with sucralose include acesulfame-K, cyclamate and alitame.

The beverage compositions of the present invention also may contain other conventional ingredients such as water, flavoring agents, artificial colorants, vitamin additives, acidulants, buffering agents, preservatives, caffeine, salts, thickeners, emulsifiers and fruit juice concentrates. Examplary flavoring agents include natural and/or artificial flavors. Artificial colorants which may be used in beverage compositions according to the present invention include caramel color, yellow 6 and yellow 5. Useful vitamin additives include vitamin B2, vitamin B6, vitamin B12, vitamin C (ascorbic acid), niacin, pantothenic acid, biotin and folic acid. Suitable preservatives include sodium or potassium benzoate. Salts which may be used include sodium, potassium and magnesium chloride. Exemplary emulsifiers are gum arabic and purity gum, and a useful thickener is pectin. Suitable acidulants include citric, phosphoric and malic acid, and potential buffering agents include sodium and potassium citrate.

According to a preferred embodiment of the present invention, the one or more tannic acid compounds are used to reduce the lingering sweet aftertaste of sucralose-sweetened cola beverages. A particularly preferred embodiment of the present invention is directed to cola beverage compositions comprising from about 100 to about 220 ppm sucralose and from about 5 to about 10 ppm tannic acid, and more preferably from about 180 to about 220 ppm sucralose and from about 8 to about 10 ppm tannic acid. Most preferably, the cola composition contains about 220 ppm sucralose and about 10 ppm tannic acid.

Another embodiment of the present invention relates to a method for reducing the lingering sweet aftertaste in a sucralose-sweetened beverage composition by adding one or more tannic acid compounds to that composition. As discussed previously, tannic acid is preferably added in a stoichiometric amount of from about 10 to about 200 ppm tannic acid per 220 ppm sucralose, and more preferably in a stoichiometric amount of about 10 ppm tannic acid per 220 ppm sucralose.

A yet further embodiment of the present invention relates to a method of making a beverage composition, which involves blending or mixing into a beverage composition sucralose and one or more tannic acid compounds in the stoichiometric amounts discussed previously.

In accordance with the foregoing preferred embodiments, the one or more tannic acid compounds may be added to the beverage composition according to the present invention at any time during the formulation of the composition. Preferably, however, the one or more tannic acid compounds are added to the beverage composition prior to the addition of any water. Conventional mixing and blending techniques may be used to blend, mix and/or dilute the components of the beverage composition according to the present invention.

EXAMPLES

The effect of tannic acid compounds on the lingering sweet aftertaste of sucralose-sweetened compositions is illustrated by the following examples. For purposes of these example, the acronym "TA" refers to titratable acidity, and the acronym "HFCS" refers to high fructose corn syrup.

Example 1

Carbonated cola beverage compositions sweetened with 220 ppm sucralose were prepared using varying levels of a tannic acid compound. The pH and TA of these compositions were maintained at 2.8 and 12, respectively. The following ingredients were used to make the syrup for these compositions:

| | |
|---|---|
| Flavor Concentrate | 22.22 ml |
| 80% Phosphoric Acid | 5.55 g |
| Citric Acid | 0.267 g |
| Caffeine | 1.24 g |
| Sucralose (25% Solution) | 10.56 g |
| Potassium Citrate | 4.07 g |
| Water to | 2000 ml |

A beverage composition was prepared by mixing the foregoing syrup with carbonated water in a proportion of 50 ml syrup to 250 ml of carbonated water. A total of 40 (10 oz) bottles of this beverage composition were prepared using 2 liters of the syrup.

Various levels of a tannic acid compound were then added to this beverage composition, namely 200 ppm, 100 ppm, 50 ppm, 10 ppm and 5 ppm, and the resulting composition were stored at 90° F. for three days. The tannic compound used was the polygalloylester of glucose-guinic acid marketed at TANAL W2 by OmniChem Products.

At the end of the three days, the compositions were tested against a control composition containing no tannic acid. The products were evaluated at room temperature by a group of six expert assessors for overall sweetness character, cola flavor, mouthfeel, aftertaste and sweetness duration. Each of the assessors was familiar with the lingering sweet aftertaste typical of sucralose.

All assessors perceived the sucralose-sweetened compositions containing tannic acid to have a reduced lingering sweet aftertaste compared to the control product containing no tannic acid. Compositions containing 10 ppm tannic acid relative to 220 ppm sucralose were judged to be optimum. They were described as being regular-like (HFCS or sucrose-sweetened like), with no off notes and a clean sweetness. Above all, the lingering sweet aftertaste was substantially reduced, if not completely eliminated, as compared to the control.

Compositions containing larger relative amounts of tannic acid, such as 50–200 ppm tannic acid per 220 ppm sucralose, also exhibited a reduction in lingering sweet aftertaste compared to the control composition. These compositions, however, were found to be a little tart and woody in flavor as compared to compositions containing only 10 ppm tannic acid.

The use of lower relative amounts of tannic acid, such as only 5 ppm tannic acid per 220 ppm sucralose, was found to be less effective in reducing the lingering sweet aftertaste of the sucralose component.

Example 2

In a second study, eighteen panelists were presented with a number of equisweet cola samples, monadically, as listed below:

HFCS Sweetened Cola Composition
Cola Composition Sweetened with 220 ppm Sucralose
Cola Composition Sweetened with 220 Sucralose +10 ppm the Tannic Acid Compound Marketed by OmniChem Products as TANAL W2

The panelists were selected for their ability to perceive the lingering sweet aftertaste of sucralose in beverage compositions, and each was trained to score this attribute reproducibly using a stop watch. The samples were randomized between different panelists, and assessments were carried out in the controlled environment of a sensory laboratory. A fixed volume of the beverage composition under evaluation was presented to each panelist in an odorless plastic cup. The panelists were instructed to swallow the whole sample, after one swirl around the mouth, and to assess the sweetness intensity, the sourness intensity, the bitterness intensity and the sweet aftertaste duration of each sample. The results of this study are presented in Table I.

TABLE I

Mean Attribute Scores for Cola Beverage Compositions Sweetened with Sucralose

| Attribute | HFCS-Cola | Sucralose-Cola | Sucralose-Cola with Tannic Acid | Sig. Diff. |
|---|---|---|---|---|
| Sweetness Intensity | 60.01 | 55.2 | 61.35 | None |
| Sourness Intensity | 21.46 | 18.44 | 23.54 | None |
| Bitterness Intensity | 10.83 | 8.96 | 14.48 | None |
| Sweet Aftertaste Duration* | 34.48$^b$ | 59.95$^a$ | 44.77$^b$ | 90% |

*Samples not sharing a common superscript letter differ significantly at the 90% confidence level.

The results shown in Table 1 establish that, while tannic acid has no significant effect on overall sweetness intensity or any other basic sensory attribute of sucralose-sweetened cola beverage compositions, tannic acid does have a statistically significant effect on reducing the lingering sweet aftertaste associated with sucralose. The use of tannic acid brings the aftertaste of sucralose-sweetened compositions closer to that of "regular" (HFCS or sucrose-sweetened) compositions.

As will be apparent to those skilled in the art from consideration of the specification and the example herein, modifications and variations can be made to the present invention without departing from the scope or spirit of the invention. It is thus intended that the specification and examples be considered as exemplary only, with the true scope and spirit of the invention being indicated by the following claims.

What is claimed is:

1. A cola beverage composition comprising sucralose and a tannic acid compound present in a stoichiometric amount effective to reduce a lingering sweet aftertaste associated with the sucralose, said stoichiometric amount being from about 10 to about 200 ppm tannic acid per 220 ppm sucralose.

2. A cola beverage composition as recited in claim 1, wherein the tannic acid compound is present in a stoichiometric amount of from about 10 ppm tannic acid per 220 ppm sucralose.

3. A cola beverage composition as recited in claim 2, wherein the tannic acid compound is a gallotannin having a molecular weight of from about 200 to about 1900.

4. A cola beverage composition as recited in claim 3, wherein the tannic acid compound is a gallotannin having a molecular weight of from about 400 to about 900.

5. A cola beverage composition as recited in claim 1, further comprising at least one or more nutritive sweeteners or high-intensity artificial sweeteners in addition to sucralose.

6. A cola beverage composition as recited in claim 5, wherein the at least one or more additional sweeteners are high-intensity artificial sweeteners selected from the group consisting of acesulfame-K, cyclamate and alitame.

7. A cola beverage composition as recited in claim 6, wherein the at least one or more additional sweeteners are nutritive sweeteners selected from the group consisting of sucrose and high fructose corn syrup.

8. A cola beverage composition as recited in claim 5, further comprising at least one of the following: (a) one or more flavoring agents; (b) one or more artificial colorants: (c) one or more vitamin additives; (d) one or more preservatives; (e) one or more caffeine additives; (f) water; (g) one or more acidulants; (h) one or more thickeners; (i) one or more buffering agents; (j) one or more emulsifiers; and (k) one or more fruit juice concentrates.

9. A cola beverage composition as recited in claim 1, wherein the tannic acid compound is a gallotannin having a molecular weight of from about 200 to about 1900, and is present in the stoichiometric amount of from about 5 to about 10 ppm gallotannin per 100–220 ppm sucralose.

10. A cola beverage composition as recited in claim 9, wherein the composition comprises about 220 ppm sucralose and about 10 ppm gallotannin.

11. A cola beverage composition as recited in claim 10, further comprising at least one or more additional sweeteners selected from the group consisting of acesulfame-K, cyclamate, alitame, sucrose and high fructose corn syrup.

\* \* \* \* \*